United States Patent [19]

Borowski et al.

[11] 4,273,428

[45] Jun. 16, 1981

[54] DIGITAL EXPOSURE-DURATION CONTROL CIRCUIT WITH UPPER LIMIT ON EXPOSURE DURATION

[75] Inventors: Kurt Borowski; Eduard Wagensonner, both of Aschheim; Istvan Cocron, Munich, all of Fed. Rep. of Germany

[73] Assignee: AGFA Gevaert, A.G., Leverkusen, Fed. Rep. of Germany

[21] Appl. No.: 32,902

[22] Filed: Apr. 24, 1979

[30] Foreign Application Priority Data

Apr. 27, 1978 [DE] Fed. Rep. of Germany ....... 2818606

[51] Int. Cl.³ ............................................. G03B 7/093
[52] U.S. Cl. .................................. 354/23 D; 354/51; 354/60 L; 354/60 F; 354/133
[58] Field of Search ............ 354/23 D, 5, 60 R, 60 L, 354/60 F, 60 A, 37, 38, 50, 133, 266, 267

[56] References Cited

U.S. PATENT DOCUMENTS

| 3,958,256 | 5/1976 | Wagensonner | 354/23 D |
|---|---|---|---|
| 4,006,484 | 2/1977 | Nobusawa | 354/23 D |
| 4,140,379 | 2/1979 | Von Fischern | 354/51 |
| 4,171,884 | 10/1979 | Tokutomi | 354/23 D |

*Primary Examiner*—L. T. Hix
*Assistant Examiner*—Stafford D. Schreyer
*Attorney, Agent, or Firm*—Michael J. Striker

[57] ABSTRACT

A first pulse train whose pulse repetition frequency varies in dependence upon scene light, and a second pulse train whose pulse repetition frequency does not vary in dependence upon scene light, are counted by digital counting circuitry, and a terminate-exposure signal is produced when the digital counting circuitry reaches a predetermined count. The second pulse train serves to establish an upper permissible limit for the duration of the exposure to be performed.

7 Claims, 1 Drawing Figure

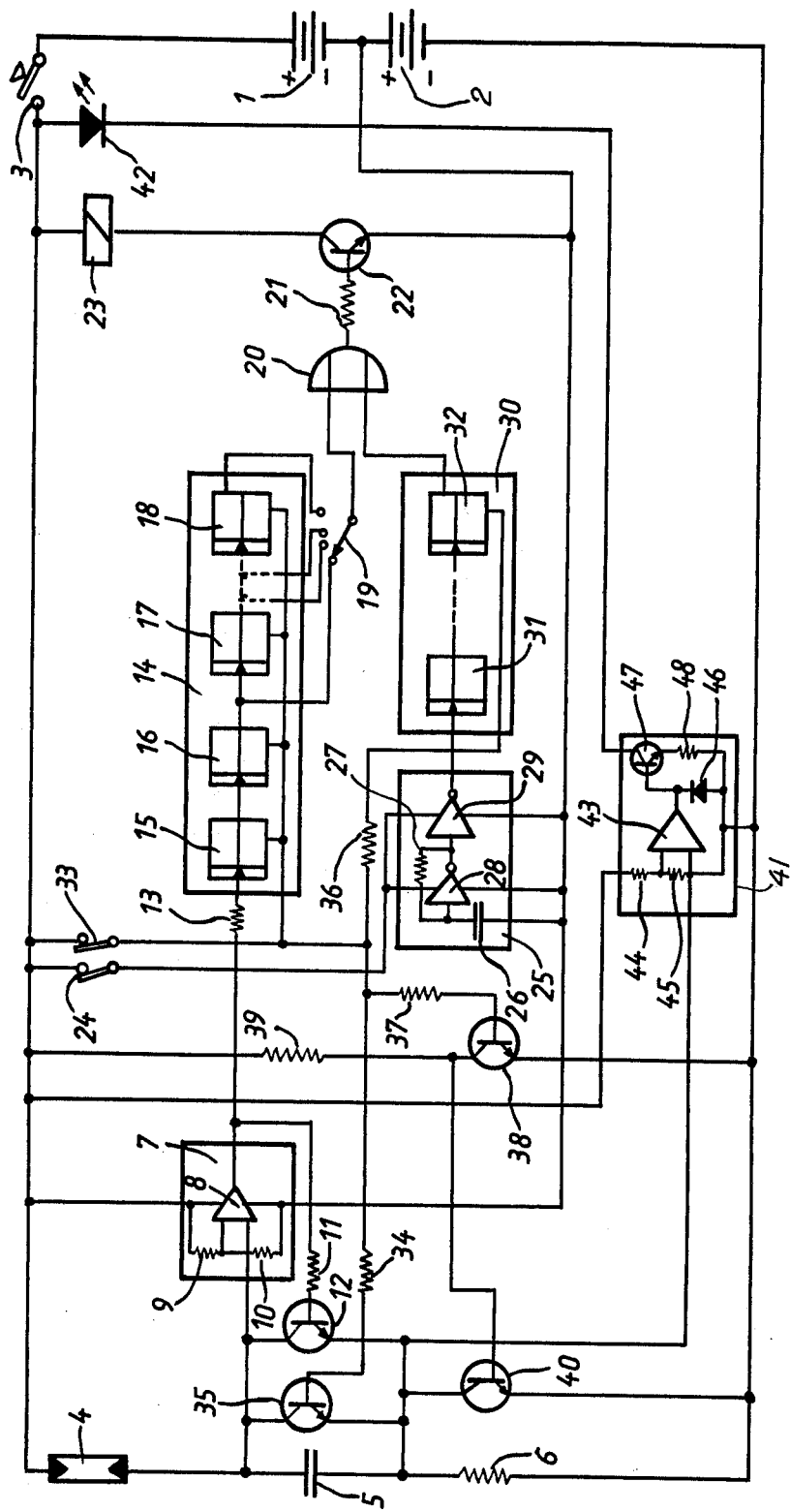

DIGITAL EXPOSURE-DURATION CONTROL CIRCUIT WITH UPPER LIMIT ON EXPOSURE DURATION

BACKGROUND OF THE INVENTION

The present invention concerns exposure-duration control circuits for photographic cameras, of the digital type, in which a digital counter counts pulses from a pulse generator, the pulse generator including a photosensitive element exposed to scene light and furnishing a pulse train whose pulse repetition frequency varies in dependence upon the scene light to which the photosensitive element is exposed. When the light-totalizing counter has reached a predetermined count, a terminate-exposure signal is generated, e.g., to deenergize a shutter-holding magnet and permit the camera's shutter to abruptly close. The circuit typically includes a start switch which resets the counter earliest upon completion of an exposure and/or also serves to initiate counting at the start of the exposure. The light-dependent pulse generator may include a photosensitive element and a timing capacitor connected in circuit with a threshold circuit stage to form an oscillator.

Such an exposure-duration control circuit is disclosed in Federal Republic of Germany published allowed patent application DE-AS 22 19 523. The duration of the exposure is established by the number of pulses which the light-totalizing counter must count before generation of the terminate-exposure signal. In low-light conditions, there is the disadvantage that the shutter may remain open for excessively long times. If the shutter is held open by a shutter-holding magnet which is deenergized to terminate the exposure, then this can, for example, result in excessively protracted energization of the shutter-holding magnet, leading rather quickly to camera-battery discharge.

With exposure-duration control circuits of other types, it is known, when a flash exposure is to be made and the camer's flash unit is switched on in readiness for operation, to place an upper limit upon the duration of the exposure by limiting the maximum value of the exposure duration which the photosensitive element of the timing circuit is capable of establishing. For example, it is known to connect a fixed resistor parallel to the photoresistor or else to connect it instead of the photoresistor in series with the timing capacitor of the circuit.

SUMMARY OF THE INVENTION

It is one object of the invention to provide an exposure-duration control circuit of the type in question of such configuration that it can readily be realized in integrated-circuit form and in which peripheral circuit components can be reduced to a minimum.

In the preferred embodiment of the invention, when the camera's built-in or attached-on flash unit is switched on in readiness for operation, or else under the control of a manual selector switch, a pulse train which is independent of scene light is applied to digital counting circuitry, i.e., either to the light-totalizing counter already present or to a further such counter, and the counter receiving the light-independent pulse train effects the generation of a terminate-exposure signal when a predetermined count has been reached. Such a configuration has the advantage that the light-dependent timing action is decoupled from the selectably switched-in light-independent timing action, and both digital circuit groups can be provided in a single integrated-circuit module. The capacitor of the pulse generator can be a discrete capacitor externally connected onto such integrated-circuit module. Alternatively, such capacitor, and the other capacitors required for the circuitry employed, can be provided by using the inherent capacitances of reverse-biased p-n junctions, with such inherent capacitances being utilized as the capacitors of Miller integrators.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts one exemplary embodiment of the present invention.

DESCRIPTION OF PREFERRED EMBODIMENTS

In the FIGURE, numerals 1 and 2 denote two camera batteries which can be connected to the remainder of the illustrated circuit via a power-connect switch 3 which closes, for example, as the user begins to depress the camera's shutter-release button. A photoresistor 4 and a timing capacitor 5 are connected in series with an indicator resistor 6. The junction between photoresistor 4 and timing capacitor 5 is connected to the input of a threshold circuit stage 7 comprised of an operational amplifier 8 and a reference voltage divider 9, 10. The reference voltage divider 9, 10 sets the threshold voltage level of threshold circuit stage 7.

The output of threshold circuit stage 7 is connected via a resistor 11 to the base of a transistor 12, whose collector-emitter path is connected directly across timing capacitor 5. The photoresistor 4, the timing capacitor 5, the threshold circuit stage 7 and the transistor 12 together form a free-running pulse generator operative for producing a train of pulses whose repetition frequency is dependent upon the values of photoresistor 4 and timing capacitor 5 and which, accordingly, varies as a function of the scene light to which photoresistor 4 is exposed.

The output of threshold circuit stage 7 is furthermore connected, via a resistor 13, to the input of a digital counter 14, here comprised of a chain of storage flip-flops 15, 16, 17, . . . , the last of which is denoted by numeral 18. The Q outputs of predetermined ones of the flip-flops 15, 16, 17, . . . , 18 are connected to respective stationary contacts of a selector switch 19, whose moving contact is connected to the upper input of an OR-gate 20. The setting of selector switch 19 is changed to take into account the sensitivity of the particular film to be exposed. The output of OR-gate 20 is connected via a resistor 21 to the base of a transistor 22 whose collector-emitter path is connected in series with a shutter-closing electromagnet 23, energized at the start of the exposure to hold the camera's shutter open and deenergized to terminate the exposure and when deenergized permitting the camera's shutter to abruptly close.

Numeral 25 denotes a further pulse generator which becomes connected to the batteries 1, 2 upon the closing of a normally open switch 24. Pulse generator 25 comprises a timing capacitor 26, a timing resistor 27, and two inverters 28, 29 and produces an output pulse train whose repetition frequency is not scene-light-dependent. The output of second pulse generator 25 is connected to the input of a further digital counter 30, likewise comprised of a chain of storage flip-flops, the first denoted 31 and the last denoted 32. The output of second digital counter 30 is connected to the lower input of OR-gate 20. When digital counter 30 begins to count the pulses produced by second pulse generator 25, the counter 30 does not produce an output "1" signal for application to OR-gate 20 until after a relatively large predetermined number of input pulses have been counted.

The time-constant of the light-dependent time-constant stage 4, 5 is so selected as to be small, at the highest anticipated scene-light level, compared to the shortest exposure time which can be physically implemented using whatever shutter mechanism or system is employed.

Numeral 33 denotes a normally closed start switch which is opened just before or right at the initiation of an exposure, for example by virtue of being coupled to the camera's shutter release button, or by virtue of being coupled to the aperture-unblocking structure of the camera's shutter mechanism so as to open exactly as the shutter begins to open. When normally closed start switch 33 is closed, positive potential is applied via a resistor 34 to the base of a transistor 35, whose collector-emitter path is connected directly across timing capacitor 5, thereby short-circuiting capacitor 5. Additionally, start switch 33 when closed serves to apply positive potential to the reset inputs R of the flip-flops internal to the first digital counter 14 and internal to the second digital counter 30 via a resistor 36.

Start switch 33 when closed additionally serves to apply positive potential via a resistor 37 to the base of a transistor 38 provided with a collector resistor 39, the collector of transistor 38 being connected to the base of a transistor 40, the collector-emitter path of the latter being connected directly across indicator resistor 6, thereby short-circuiting resistor 6.

The junction between timing capacitor 5 and indicator resistor 6 is connected to the input of a threshold circuit stage 41, in whose output circuit is connected a light-emitting diode 42, the latter indicating prior to performance of an exposure whether or not the prevailing scene-light level is sufficient for the making of an acceptable exposure. Threshold circuit stage 41 comprises an operational amplifier 43 whose threshold voltage level is set by means of a reference voltage divider 44, 45. The output of operational amplifier 43 is connected across a zener diode 46 and to the base of a transistor 47 provided with an emitter resistor 48, the collector of transistor 47 being connected to the cathode of LED 42.

The normally open switch 24 is a selector switch which closes when the user flips an external switch used to command that the illustrated exposure-duration control circuit place an upper limit upon the duration of the exposure to be performed, e.g., to prevent exposure durations of indefinitely long duration when the prevailing scene-light level is so low that light-dependent exposure termination is not assured. Conversely, the user can leave switch 24 normally closed, and flip it open only when such an upper limit is not to be placed upon the duration of the exposure to be performed. Alternatively, switch 24 is a switch which the user closes as a part of readying the camera's flash unit for operation, especially for example when the camera is provided with a built-in flash unit; or else, switch 24 is responsive to the mounting of a removable flash attachment on the camera, for example closing in mechanical response to placement of the flash attachment into operative position on the housing of the camera.

The illustrated exposure-duration control circuit operates as follows:

Previous to the initiation of an exposure, the user partially depresses the camera's shutter release button, to effect closing of power-connect switch 3, or effects closing of switch 3 in another manner. Normally closed start switch 33 stays closed, and accordingly the two digital counters 14, 30 are held at their starting counts, transistor 35 is conductive thereby keeping timing capacitor 5 short-circuited, and transistor 40 is non-conductive thereby permitting indicator resistor 6 to cooperate with photoresistor 4 to form a light-dependent voltage divider 4, 6 whose tap is connected to the input of threshold circuit stage 41. Because timing capacitor 5 is short-circuited, light-dependent pulse generator 4, 5, 7, 12 is deactivated. If the scene-light is sufficient, the voltage produced at the junction between the photoresistor 4 and indicator resistor 6 of the light-dependent voltage divider 4, 6 is greater than the reference voltage of the operational amplifier 43 of second threshold circuit stage 41, transistor 47 is non-conductive and LED 42 is unilluminated. When the prevailing scene-light level is insufficient, the reference voltage of operational amplifier 43 is not exceeded, transistor 47 is conductive and LED 42 is illuminated to inform the user that an exposure cannot appropriately be made.

It will be assumed that the circuit has informed the user that the prevailing scene light is sufficient for the making of an exposure, and furthermore that normally open selector switch 24 remains open, because the user has not flipped it closed, or because the camer's flash unit has not been switched on or, if a removable accessory unit, has not been mounted into operative position on the camera housing. The user presses the camera release button to initiate an exposure, and at the start of the exposure normally closed start switch 33 opens. As a result, transistor 40 is rendered conductive thereby short-circuiting indicator resistor 6, transistor 35 is rendered non-conductive thereby connecting photoresistor 4 and timing capacitor 5 in circuit with each other, and positive potential is removed from the reset inputs R of the flip-flops internal to the two digital counters 14 and 30 thereby permitting these counters to count. The light-dependent pulse generator 4, 5, 7, 12 begins to oscillate and applies to the input of first digital counter 14 a pulse train whose pulse repetition frequency increases with increasing scene light and decreases with decreasing scene light. When light-totalizing counter 14 has reached the count determined by the setting of film-sensitivity selector switch 19, a "1" signal becomes applied to the upper input of OR-gate 20, as a result of which the hitherto high potential at the output of the OR-gate is replaced by low potential, rendering hitherto conductive transistor 22 non-conductive and thereby deenergizing the shutter holding electromagnet 23 and permitting the camera's shutter to abruptly close.

If the user manually closes selector switch 24, i.e., separately or as an incident to switching on the camera's flash unit, or if switch 24 closes in response to placement of the camera's removable flash attachment into operative position on the camera housing, this switches on light-independent second pulse generator 25. The pulse train produced by generator 25, of fixed pulse repetition frequency, is applied to the input of second counter 30, and when the latter reaches a predetermined count a "1" signal is applied to the lower input of OR-gate 20, and the high output potential of the latter converts to low potential, rendering transistor 22 conductive and thereby terminating the exposure, i.e., if this has not already been effected by light-totalizing counter 14.

It will be understood that each of the elements described above, or two or more together, may also find a useful application in other types of circuits differing from the types described above.

While the invention has been illustrated and described as embodied in an exposure-duration control circuit comprising pulse generators and two digital counters of particular configuration, it is not intended to be limited to the details shown, since various modifications and structural changes may be made without departing in any way from the spirit of the present invention.

For example, in the illustrated embodiment the light-dependent pulse train and the light-independent pulse train are counted by respective digital counters 14 and 30. However, it would also be possible to utilize only a single such digital counter, and to disconnect the light-dependent pulse generator from and connect the light-independent pulse generator to the single digital counter when switching over from light-dependent to light-independent exposure-duration control action.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An exposure duration control circuit, comprising: a photosensitive element; a first pulse generator connected to the photosensitive element and producing a first pulse train having a frequency which is dependent upon intensity of ambient scene light incident upon the photosensitive element; an adjustable counter connected to the first pulse generator and counting pulses in the first pulse train, the adjustable counter being adjustable in dependence upon film speed and operating in a manner that when the adjustable counter has counted a number of pulses in the first pulse train which the counter has been adjusted to count, the adjustable counter produces a first output signal which can cause an exposure to be terminated; a second pulse generator generating a second pulse train having a constant frequency; a non-adjustable counter connected to the second pulse generator and operating in a manner that after a predetermined number of pulses in the second pulse train have been counted, the non-adjustable counter produces a second output signal which can cause an exposure to be terminated; a switch connected to the second pulse generator and turning it on and off; and an output stage connected to the counters and responding to the first and second output signals in a manner that whichever one of the first and second output signals which is first generated will cause an exposure to be terminated.

2. The exposure duration control circuit defined by claim 1, wherein the switch is responsive to the connection of a flash unit and turns the second pulse generator on when a flash unit is to be utilized and turns the second pulse generator off otherwise.

3. The exposure duration control circuit defined by claim 1, wherein the output stage includes a two-input OR-gate which is so connected that one of its inputs responds to the first output signal and another one of its inputs responds to the second output signal.

4. The exposure duration control circuit defined by claim 1, wherein the first pulse generator includes a capacitor which is charged by a current passing through the photosensitive element, wherein the first pulse generator includes a threshold stage monitoring charge across the capacitor and generating a pulse when such charge exceeds a predetermined value, wherein the first pulse generator includes a starting switch connected across the capacitor and connected to the threshold stage and discharging the capacitor when a pulse is generated, and wherein the first pulse generator includes a start switch causing charging of the capacitor to begin upon exposure initiation.

5. The exposure duration control circuit defined by claim 1, further including an exposure threshold reference and an indicator connected thereto, the exposure threshold reference being connected to the photosensitive element and responding to ambient scene light incident thereupon to ascertain existence and non-existence of ambient light levels sufficient to make a proper exposure possible, and operating the indicator to indicate such existence and non-existence.

6. The exposure duration control circuit defined by claim 4, wherein the capacitor is a reverse-biased p-n junction, which junction contains an inherent capacitance.

7. An exposure duration control circuit, comprising: a photosensitive element; a first pulse generator connected to the photosensitive element and producing a first pulse train having a frequency which is dependent upon intensity of ambient scene light incident upon the photosensitive element; an adjustable counter connected to the first pulse generator and counting pulses, the adjustable counter being adjustable in dependence upon film speed and operating in a manner that when the adjustable counter has counted a number of pulses which the counter has been adjusted to count, the adjustable counter produces a first output signal which can cause an exposure to be terminated; a second pulse generator generating a second pulse train having a constant frequency and connected to the adjustable counter; a switch connected to the second pulse generator and turning it on and off; and an output stage connected to the adjustable counter and responding to the first output signal in a manner that whenever the first output signal is generated, an exposure will be terminated.

* * * * *